US008683194B2

(12) United States Patent
Battistello et al.

(10) Patent No.: US 8,683,194 B2
(45) Date of Patent: Mar. 25, 2014

(54) METHOD AND DEVICES FOR SECURE COMMUNICATIONS IN A TELECOMMUNICATIONS NETWORK

(75) Inventors: Patrick Battistello, Perros-Guirec (FR); Henri Gilbert, Bures sur Yvette (FR)

(73) Assignee: Orange, Paris (FR)

( * ) Notice: Subject to any disclaimer, the term of this patent is extended or adjusted under 35 U.S.C. 154(b) by 7 days.

(21) Appl. No.: 13/497,571

(22) PCT Filed: Sep. 28, 2010

(86) PCT No.: PCT/FR2010/052028
§ 371 (c)(1),
(2), (4) Date: Mar. 22, 2012

(87) PCT Pub. No.: WO2011/039460
PCT Pub. Date: Apr. 7, 2011

(65) Prior Publication Data
US 2012/0191971 A1    Jul. 26, 2012

(30) Foreign Application Priority Data

Sep. 30, 2009  (FR) ........................ 09 56821
Dec. 23, 2009  (FR) ........................ 09 59458

(51) Int. Cl.
*H04L 9/08*    (2006.01)
(52) U.S. Cl.
USPC .............................. 713/155; 380/44; 726/10
(58) Field of Classification Search
USPC ................................................. 713/155
See application file for complete search history.

(56) References Cited

U.S. PATENT DOCUMENTS

| 7,024,692 B1 | 4/2006 | Schanze et al. | |
|---|---|---|---|
| 2004/0010699 A1* | 1/2004 | Shao et al. | 713/189 |
| 2005/0027985 A1 | 2/2005 | Sprunk et al. | |
| 2007/0266241 A1* | 11/2007 | Wu et al. | 713/160 |
| 2008/0162938 A1* | 7/2008 | Struik | 713/171 |

FOREIGN PATENT DOCUMENTS

| WO | 2007/062672 A1 | 6/2007 |
|---|---|---|
| WO | 2008/091517 A1 | 7/2008 |
| WO | 2010/133783 A1 | 11/2010 |

OTHER PUBLICATIONS

C. Neuman et al., The Kerberos Network Authentication Service (V5), Jul. 2005, http://tools.ietf.org/html/rfc4120.*

(Continued)

*Primary Examiner* — Andrew L. Nalven
*Assistant Examiner* — Khang Do
(74) *Attorney, Agent, or Firm* — Drinker Biddle & Reath LLP

(57) ABSTRACT

A secure communications method is provided for use in a telecommunications network, wherein a transaction between an entity A and an entity B of the network comprises: entity A sending an authorization request to an Authorization Server S, in which request the entity A identifies itself and authenticates itself; the entity A declares to the Authorization Server its intention to communicate with a certain entity B; the Authorization Server determines a secret key that it shares with the entity B; the Authorization Server generates a session key and sends it to the entity A; the session key being a one-way function of the secret key and also being a function of an integer (transaction number) allocated to the transaction; the Authorization Server also generates a transaction identifier that is a function depending at least on the transaction number in non-invertible manner.

13 Claims, 3 Drawing Sheets

(56) References Cited

OTHER PUBLICATIONS

Battistello et al., "Analysis of Token and Ticket Based Mechanisms for Current VoIP Security Issues and Enhancement Proposal," Communications and Multimedia Security, Springer Berlin Heidelberg, Berlin, Heidelberg, pp. 154-165 (May 31, 2010).

Battistello, "Work in Progress: Inter-Domain and DoS-Resistant Call Establishment Protocol (IDDR-CEP)," Principles, Systems and Applications of IP Telecommunications, IPTCOMM'10, No. 31, pp. 22-31 (Aug. 2, 2010).

Huang, "Using Identity-Based Privacy-Protected Access Control Filter (IPACF) to Against Denial of Service Attacks and Protect User Privacy," Thesis Submitted to the Graduate Faculty of Auburn University, US, pp. 1-75 (Aug. 7, 2007).

Kuhn et al., "Security Considerations for Voice Over IP Systems Recommendations of the National Institute of Standards and Technology," NIST Special Publication 800-58, pp. 1-99, (Jan. 1, 2005).

\* cited by examiner

METHOD AND DEVICES FOR SECURE COMMUNICATIONS IN A TELECOMMUNICATIONS NETWORK

CROSS-REFERENCE TO RELATED APPLICATIONS

This application is the U.S. national phase of the International Patent Application No. PCT/FR2010/052028 filed Sep. 28, 2010, which claims the benefit of French Application No. 09 56821 filed Sep. 30, 2009, and French Application No. 09 59458 filed Dec. 23, 2009, the entire content of both is incorporated herein by reference.

FIELD

The present invention relates to making communication secure in a telecommunications network.

BACKGROUND

Telecommunications networks, such as the Internet, transmit data between various network entities such as a web server or an electronic messaging server via a common infrastructure. By way of example, the invention may apply to secure access from a network entity to a service platform.

The invention may also apply, by way of example, to transmitting an "original message" from a network entity to one or more other network entities; the term "original message" is used therein to mean any data set, e.g. electronic mail, or a request to initiate a voice-over Internet protocol (VoIP) call, or indeed an "instant message". In general terms, an original message is sent by an "originating client" attached to an "originating" domain and connected to a "sending" domain, to a "destination client" attached to a "destination domain" and connected to a "receiving" domain (in the context of the present invention, an entity is said to be "attached" to a network domain when the entity possesses a service and/or a logical and/or an administrative link with the domain; for electronic mail, the logical address corresponds to the "email address"). The sending domain may optionally be distinct from the originating domain, and the receiving domain may optionally be distinct from the destination domain; this distinction between domains is useful, e.g. when a sending domain relays to a destination client a message sent by a roaming originating client who is connected to the sending domain but who is not attached to the sending domain.

As is well known, telecommunications networks are subjected to attacks aiming at professional, administrative, or individual targets. An attack that is nowadays commonplace consists in sending to as many destinations as possible messages that are undesirable in that they are not called for, such as "spam" for email or "spit" for Internet telephone calls. The term "undesirable" is used broadly and applies equally to the identity of the originator of the message, which may be authentic or falsified, and to the content of the message.

The potential for spam/spit type attacks relies in particular on the following factors:
  the weakness of the protocols used on the Internet, such as the simple mail transfer protocol (SMTP) that is in the most widespread use for transferring email and that in particular does not incorporate functions for authenticating the sender of mail;
  the increase in the power of computers that can send undesirable messages in bulk in automatic manner over a period that is very short; and
  the increase in the number of networks that have access to the Internet and in the connectivity between those networks, thereby presenting a very large number of targets for attackers who can hide behind networks that are relatively lax or beyond the legal or administrative ambit of the target networks.

Furthermore, it is not easy for a sending domain of the type "sender.fr" to determine whether an address of the type user@originator.fr supplied by a roaming originating client connected to the sending domain is valid, i.e. whether the client's address is indeed allocated in the domain "originator.fr", and whether the client has the right to send a message from that address: the sending domain does not manage identities, i.e. the logical addresses of the type "originator.fr". This difficulty of verification is often taken advantage of by attackers to send messages under a false identity from a domain to which attackers have access, or indeed via a corrupted machine situated in a legitimate domain. For example, an Internet domain "domain.fr" created by an attacker is entirely suitable for use in sending voice calls with a caller identity +332abcdefgh@domain.fr, even though the subscriber number "+332abcdefgh" is in fact allocated, say, to the domain "orange.fr". Faced with an attack of this kind, requiring the calling domain to add a digital signature (cf. Internet engineering task force (IETF) document request for comments (RFC) 4474) is ineffective, since although it guarantees for the destination that the call does indeed come from "domain.fr", it does not guarantee for the destination that the calling number is, in fact, registered in that domain.

One solution to this difficulty of checking consists in acting in the sending domain to block the sending of any message for which the originating address is not attached to the sending domain, however that solution is too limiting, in particular concerning the mobility of VoIP services that enable a roaming terminal to use a third-party relay such as a sending domain in order to set up a telephone call. This situation raises the problem of finding means that enable a destination domain to make sure that sufficient checks have been performed in the domain from which the message is being sent.

In the context of the present invention, the term "transaction" is used to cover all of the protocol exchanges that enable a shared secret or "primary session key" to be set up between two network entities A and B for the duration of a session. The transaction corresponds to the stage of initializing the session, which session may last for much longer than the transaction. In certain portions of the description, the terms "transaction" and "session" may be considered as being equivalent. For simplification purposes, the primary session key is also referred to as a "session key" between A and B, independently of any key-deriving or key-diversifying operations that may be applied thereto. The session key may for example be used to derive other secret keys for setting up a secure connection (transport layer security (TLS), Internet protocol security (IPSec), etc.) between the entities A and B. As another example, the session key may serve to guarantee the confidentiality or the integrity of an original message sent by the entity A (originating client) to the entity B (destination client); each new original message sent from an originating client to one or more destination clients corresponds to a new transaction; conversely, repeating a protocol step, e.g. as a result of a network problem, is not considered as a new transaction.

In principle, a network entity may naturally authenticate another network entity by means of a public key infrastructure (PKI). However, it is well known that PKIs are cumbersome to put into place and use.

In a variant, certain methods, such as the Diffie-Hellman algorithm, enable a session key to be determined in common by two entities prior to exchanging any original messages between them. However such an algorithm does not, in itself, give an entity A any guarantee about the identity of an entity B with which a session key is thus established.

In a variant, in networks having a small number of users, such as peer-to-peer networks, it is possible to provide for "manual" installation of a shared secret key for each pair of interested entities (e.g. by an on-site visit). However installing a shared secret key in this way is unsuitable for networks having a large number of users.

A solution that is well adapted to networks having a large number of users consists in setting up a trusted third party, commonly referred to as a "key distribution center". Each network entity A seeking to make use of this secure communications service, takes out a subscription with the key distribution center, and consequently obtains, for a predetermined duration or for a predetermined transaction, a secret key $K_{SA}$ that is shared between A and an Authorization Server S associated with the key distribution center. Advantageously, the subscribers to this service do not need to store secrets or certificates relating to other subscribers, with communications being made secure on a transaction-by-transaction basis involving participation of the key distribution center. Furthermore, the key distribution center may, depending on requirements, transmit secret keys in secure manner to supporting entities (storage, gateways, etc.) that are under its control, or to legal entities in order to intercept certain communications. Since the key distribution center holds all of the secret keys of the subscribers, it is clearly essential for it to be powerfully protected against any hostile intrusion, however that does not represent any particular difficulty.

By way of example, one such method for secure communications between two entities A and B subscribing to a service is known under the name "Kerberos" (cf. IETF document RFC 4120). The Kerberos method essentially comprises the following steps:

1) an entity A identifies itself with an Authorization Server S and authenticates itself as the holder of an identifier $ID_A$ (after addressing itself to an authentication server that is distinct from the Authorization Server S); the Authorization Server S determines the secret key $K_{SA}$ that it shares with this entity A;

2) the entity A declares to the Authorization Server S its intention to communicate with a certain entity B; the Authorization Server S determines the secret key $K_{SB}$ that it shares with the entity B;

3) the Authorization Server S generates a session key $K_{AB}$, and sends it to the entity A in encrypted form using said secret key $K_{SA}$;

4) the Authorization Server S also generates a "ticket" T comprising at least said identifier $ID_A$ of the entity A and said session key $K_{AB}$; the Authorization Server S sends the entity A check data $CHECK_A$ that is the result of encrypting said ticket T using said secret key $K_{SB}$;

5) the entity A decrypts the session key $K_{AB}$ using its secret key $K_{SA}$, and it sends to the entity B both the data $CHECK_A$ (that has been previously received by the entity A from the Authorization Server S), and also data $\delta_A$ that is the result of using the session key $K_{AB}$ to encrypt a set of elements comprising at least its own identifier $ID_A$; and 6) the entity B decrypts the ticket T using its secret key $K_{SB}$; the session key $K_{AB}$ then enables it to decrypt the identifier $ID_A$ of the entity A; the entity B verifies that this identifier is indeed the same as that contained in the ticket T; if the entity B approves the transaction, then it informs the entity A of this approval.

The entity A may then finish off the transaction with the entity B. For example, if the entity B is a supplier of services, the entity A may request some particular service and obtain it, by exchanging data with the entity B, which data is encrypted using the session key $K_{AB}$. As another example, if the entity B is expecting a document from the entity A, then the entity A may send an original message to the entity B accompanying by the message authentication code (MAC) of the original message as obtained by means of the session key $K_{AB}$ (it should be recalled in this respect that in conventional manner, a MAC is a short value, generally occupying a few tens of bits, that is deduced from the data contained in a message and from a secret key shared between the sender and the receiver of the message by using a cryptographic algorithm; by sending a message accompanied by its authentication code, the sender enables the receiver to verify that the data does not come from any other entity and that it has not been tampered with between being sent and being received).

The Kerberos method thus provides for the session key to be transmitted firstly directly to the entity A and secondly indirectly (passing via the entity A) to the entity B; the entity B therefore has no need to communicate with the Authorization Server S in order to obtain the session key. The Kerberos method also makes it possible, advantageously, for the entity B to verify the identity of the entity A; this verification prevents a so-called "phishing" type attack in which an attacker identifies itself initially under its genuine identity with the Authorization Server S in order to obtain a transaction authorization from the server, and then under a usurped identity with the entity B (e.g. by passing itself off as the bank of the entity B in order to obtain confidential bank information).

Nevertheless, the Kerberos method presents the drawback that the entity B is still vulnerable to flooding attacks. On reconsidering step No. 6 above, it can be seen that before it is capable of identifying an attack, the entity B must perform two decrypting operations followed by an operation of verifying a match. Unfortunately, decrypting operations are expensive in terms of calculation time, such that an attacker can submerge the entity B by sending arbitrary data $CHECK_A$ and $\delta_A$ repeatedly to the entity B. Worse, an attacker may send to the entity B data $CHECK_A$ and $\delta_A$ that the attacker has previously read or intercepted during a transaction initiated by a legitimate entity A (replay attacks): under such circumstances, the attacker floods not only the entity B, but also the legitimate entity A, which receives confirmation messages from the entity B in repeated manner; version 5 of the Kerberos method does indeed protect legitimate entities A from flooding attacks by recommending that a time and date stamp be inserted in the data $\delta_A$, however that further increases the burden on the entity B since it must verify that successive data items $\delta_A$ that it receives from a certain entity A all present different time stamps, thereby only worsening the flooding of the entity B.

SUMMARY

The present invention thus provides a secure communications method for use in a telecommunications network, wherein a transaction between an entity A and an entity B of said network comprises the following steps:

a) the entity A sends an authorization request to an Authorization Server S, in which request the entity A identifies itself and authenticates itself as the holder of an identifier $ID_A$;

b) the entity A declares to the Authorization Server S its intention to communicate with a certain entity B; the Authorization Server S determines a secret key $K_{SB}$ that it shares with the entity B; and c) the Authorization Server S generates a session key $K_{AB,N}$ and sends it to the entity A.

Said method is remarkable in that said session key $K_{AB,N}$ is a one-way function of said secret key $K_{SB}$ and is also a function of an integer N allocated to said transaction, which integer is referred to as the transaction number, and in that it further comprises the following steps:

d) the Authorization Server S also generates a transaction identifier $IDTR_N$ that is a function depending at least on said transaction number N in non-invertible manner;

e) the Authorization Server S causes elements to reach the entity B, which elements comprise at least said transaction identifier $IDTR_N$; and f) the entity B verifies at least that the value of the transaction identifier $IDTR_N$ received during above step e) appears within a set of values precalculated by the entity B and corresponding to at least one predicted value for a transaction number; if so, the entity B deduces therefrom firstly the current value of the transaction number N and subsequently the value of the session key $K_{AB,N}$.

It is clear that step b) does not necessarily take place after step a). Similarly, step d) does not necessarily take place after step c).

It should be observed that the authenticity of entity A may be evaluated by any known authentication means. Furthermore, it may be performed by making a previous inquiry with an authentication server that is distinct from the Authorization Server S (in a manner analogous to the Kerberos method).

In practice, and for cryptographic separation requirements, it should also be observed that it is not necessarily the (primary) session key $K_{AB,N}$ that is used for encrypting exchanges between the entities A and B, but rather, where appropriate, one or more keys derived from $K_{AB,N}$. For simplification purposes, the keys derived from a primary key are not always described in the present document, but a prior art operation of deriving or diversifying keys should be understood implicitly whenever a given shared secret is used for implementing a plurality of cryptographic functions.

Thus, in the present invention, for each new transaction identified by its transaction number N, the Authorization Server S supplies the session key $K_{AB,N}$ to the entity A, but not to the entity B. Unlike the Kerberos method, the entity B of the invention possesses its own means for calculating this session key from the secret key $K_{SB}$ that it shares with the Authorization Server S, and from the current transaction number N that the entity B determines after receiving the transaction identifier $IDTR_N$.

By means of the invention, it is possible to benefit from the above-mentioned advantages of secure communications methods of the "key distribution center" type. In particular, verification of any entity subscribing to the secure communications service is required before it can communicate with another subscriber entity, thereby providing security guarantees for that other identity.

Furthermore, the invention advantageously eliminates the above-mentioned drawback of the Kerberos method relating to the vulnerability of the entity B to flooding attacks.

In the present invention, during above step e), the entity B receives the transaction identifier $IDTR_N$ from the Authorization Server S, either directly or else via another entity, which may advantageously be the entity A (cf. the embodiments described in detail below). Furthermore, the entity B calculates the value of the transaction identifier $IDTR_N$ for at least one value N of the transaction number, which value is designed to follow on from a value used in a preceding transaction. Given the potential for disorder that may occur on arrival at an entity B when a plurality of transactions all addressed to the same entity B have been initiated over a short period of time by one or more entities A, it is preferable for the entity B to precalculate a set of values of the transaction identifier $IDTR_N$ for a predetermined sequence comprising a plurality of values of the integer N, and after receiving a certain transaction identifier $IDTR_N$, for it to identify which transaction number N corresponds to the received transaction identifier by scanning through its set of values for $IDTR_N$. It should be recalled in this respect that the value of $IDTR_N$ is a function that depends at least on the integer N in non-invertible manner, such that it is not possible to calculate the value of the integer N from the value of $IDTR_N$ by inverting the function, nor is it possible to calculate any of the values $IDTR_{N+i}$ (i>0) given knowledge of some or all of the preceding values $IDTR_{N-j}$ (j≥0).

By means of these provisions, the entity B can easily detect an attack (i.e. after few calculation operations) on observing that a received value that is supposed to represent a valid transaction identifier $IDTR_N$ does not appear within said set of precalculated values (as explained above, an attacker has a minuscule chance of guessing a transaction number value N that is acceptable at a given moment for a given entity B, such that the attacker cannot calculate an acceptable value for $IDTR_N$, even if the way in which the transaction identifier $IDTR_N$ depends on N is made public). This serves to protect entities subscribing to the secure communications service from flooding attacks.

An additional advantage of the invention compared with the Kerberos method lies in the size (as a number of bits) of the protocol messages. In the Kerberos method, the entity A sends the data $CHECK_A$ as calculated by encrypting the ticket T to the entity B; however the ticket T is necessarily of large size since it comprises, in particular, the session key $K_{AB}$. This large size may give rise to problems with certain architectures making use of a non-connected transport mode (e.g. those using session initialization protocol (SIP) for signaling), in which the nominal size of signaling messages sometimes prevents large amounts of data being inserted.

In contrast, in the present invention, the entity A advantageously does not need to send the session key $K_{AB,N}$ to the entity B.

Furthermore, the (direct or indirect) transmission of the transaction identifier $IDTR_N$ from the Authorization Server S to the entity B during above step e) likewise does not require any message of large size, since the transaction identifier $IDTR_N$ may be a function of modest size (characteristically, a few bytes), while providing good security, cryptographically speaking.

When the confidentiality of exchanges between the Authorization Server S and the entity A is not ensured by the underlying transport protocol, the Authorization Server S acts during above step c) to send said session key $K_{AB,N}$ to the entity A, preferably in a confidential form OP calculated by means of a secret key $K_{SA}$ shared between the Authorization Server S and the entity A (or by means of a key that is derived from this secret key $K_{SA}$). Under such circumstances, the entity A naturally makes use of its secret key $K_{SA}$ in order to obtain the session key $K_{AB,N}$.

According to particular characteristics, said authorization request sent by the entity A to the entity S comprises a request identifier $IDREQ_M$ that is a function depending in non-invertible manner at least on an integer M allocated to said authorization request, and referred to as the authorization number.

By means of these provisions, the Authorization Server S is also protected against flooding attacks. The Authorization Server S can easily detect an attack (i.e. it needs to perform few calculation operations) on observing that a received value that is supposed to be a request identifier $IDREQ_M$ does not correspond to any of the values for the authorization number M that follow on from the previously used authorization numbers in application of a predetermined sequence that is associated with the entity A.

According to even more particular characteristics, during above step c), the Authorization Server S also sends to the entity A an authorization identifier $IDAUT_M$ that is a function that depends in non-invertible manner at least on said authorization number M.

By means of these provisions, the entity A is also protected against flooding attacks. The entity A easily detects an attack (i.e. it has few calculation operations to perform) on observing that a received value that is supposed to represent a value authorization identifier $IDAUT_M$ does not correspond to an acceptable value for the authorization number M (i.e. a value of M allocated to an authorization request previously sent by the entity A to the Authorization Server S).

According to other particular characteristics, all or some of said elements sent to the entity B during above step e) are integrity protected.

By means of these provisions, these elements are protected against any alteration; almost any such alteration would cause the transaction to fail. This integrity protection may be performed in particular by means of a MAC code.

According to even more particular characteristics, said integrity protection is performed by means of said session key $K_{AB,N}$ or a key derived from said session key $K_{AB,N}$.

By means of these provisions, the entity B can be sure that the entity that has sent it elements comprising a valid transaction identifier $IDTR_N$ does indeed have the session key $K_{AB,N}$ associated with the current transaction. These provisions also make it possible to send the transaction identifiers $IDTR_N$ to the entity B in the clear, for reasons of simplicity.

According to yet other particular characteristics, said elements that the Authorization Server S causes to reach the entity B during above step e) also comprise check data $CHECK_{A,N}$ depending on the transaction number N and deduced, by means of a cryptographic function depending on a secret key $K_{SB,check}$ derived from said secret key $K_{SB}$, from a set of elements taken from said authorization request, and optionally from the transaction number N.

It should be observed that in order to do this it is possible to envisage (at least) two variants. In a first variant, the variables to which said cryptographic function is applied comprise only elements taken from said authorization request: under such circumstances, it is necessary for the secret key $K_{SB,check}$, then written $K_{SB,N}$, to be a one-way function of the transaction number N (and of the secret key $K_{SB}$). In a second variant, the transaction number N is indeed included amongst the variables to which said cryptographic function is applied: under such circumstances, said secret key $K_{SB,check}$ does not necessarily depend on N, and need only be a one-way function of the secret key $K_{SB}$.

By means of these provisions, the Authorization Server S can prove to the entity B that it has indeed authorized the transaction and can inform it about the information on which it relied in order to do so.

According to yet other particular characteristics, the entity A causes the entity B to receive said identifier $ID_A$ of the entity A or else an identifier $ID'_A$ derived therefrom, e.g. used for anonymity requirements.

By means of these provisions, the entity B is informed about the identity of the entity A that has initiated the transaction number N therewith.

According to even more particular characteristics:
said set of elements from which said data $CHECK_{A,N}$ is deduced comprise the identifier $ID_A$ of the entity A or said derived identifier $ID'_A$; and
during said step f), the entity B uses said secret key $K_{SB,check}$ to verify consistency between firstly the data $CHECK_{A,N}$ received (directly or indirectly) from the Authorization Server S as briefly described above, and secondly said elements comprising the identifier $ID_A$ or the derived identifier $ID'_A$ received from the entity A as briefly described above.

By means of these provisions, the entity B can verify that the entity A attempting to communicate therewith is indeed authorized by the Authorization Server S under the same identity $ID_A$ or $ID'_A$ ("anti-phishing").

The mechanism used in this implementation of the invention is thus equivalent to the mechanism used in Kerberos by decrypting the ticket T. In contrast, in Kerberos, the entity A knows the value of the ticket T and the result $CHECK_A$ of encrypting the ticket T with the secret key $K_{SB}$; if the entity A is dishonest (and has powerful calculation means available), it might be able to deduce $K_{SB}$ therefrom, by brute force or by some other cryptographic means (since the encryption algorithm is, in principle, public).

The invention solves this problem, even in the implementation in which the data $CHECK_{A,N}$ is transmitted from the Authorization Server S to the entity B by being relayed via the entity A. Although it is true in the first above-described variant for calculating $CHECK_{A,N}$, that the entity A knows $CHECK_{A,N}$ and the variables to which said cryptographic function is applied, it is of no help to the entity A to deduce therefrom the value of the secret key $K_{SB,N}$, since it is not possible from that secret key to calculate the "parent" secret key $K_{SB}$, or even $K_{SB,N+1}$ or even the current transaction number N. In the second above-described variant for calculating $CHECK_{A,N}$, the entity A does not even know all of the variables to which said cryptographic function is applied, since it does not know the current transaction number N.

It should also be observed that this data $CHECK_{A,N}$, unlike the data $CHECK_A$ of the Kerberos method, may be modest in size since it is not necessarily the result of encrypting a secret key.

Correspondingly, the invention also provides various devices.

Thus, the invention firstly provides a device referred to as an Authorization Server for securing communications in a telecommunications network during a transaction between an entity A and an entity B, the device comprising means for:
identifying and authenticating an entity A holding an identifier $ID_A$;
determining a secret key $K_{SB}$ that said Authorization Server S shares with an entity B with which the entity A declares its intention to communicate; and
generating a session key $K_{AB,N}$ and sending it to the entity A.

Said device is remarkable in that said session key $K_{AB,N}$ is a one-way function of said secret key $K_{SB}$ and is also a function of an integer N allocated to said transaction and referred to as the transaction number, and the device also comprises means for:

generating a transaction identifier $IDTR_N$ that is a function depending in non-invertible manner at least on said transaction number N; and causing said transaction identifier $IDTR_N$ to reach said entity B.

Secondly, the invention also provides a device referred to as an entity B for secure communications in a telecommunications network. Said device is remarkable in that it comprises means for use during a transaction involving said entity B and an entity A, to:

receive elements comprising a transaction identifier $IDTR_N$ generated by an Authorization Server S, said transaction identifier $IDTR_N$ being a function depending in non-invertible manner at least on an integer N allocated to said transaction and referred to as the transaction number;

verify that the value of the received transaction identifier $IDTR_N$ appears within a set of values precalculated by the entity B and corresponding to at least one predicted value for said transaction number;

deduce therefrom the current value N of the transaction number; and deduce therefrom a session key $K_{AB,N}$ that is firstly a function of the transaction number N and secondly a one-way function of a secret key $K_{SB}$ shared by the entity B and said Authorization Server S.

Thirdly, the invention also provides a device, referred to as an entity A, for secure communications in a telecommunications network, the device comprising means for use during a transaction involving said entity A and an entity B to:

identify itself and authenticate itself as the holder of an identifier $ID_A$ with an Authorization Server S;

declare to said Authorization Server S its intention to communicate with a certain entity B; and receive from the Authorization Server S a session key $K_{AB,N}$.

Said device is remarkable in that said session key $K_{AB,N}$ is a one-way function of a secret key $K_{SB}$ shared by the Authorization Server S and the entity B and is also a function of an integer N allocated to said transaction and referred to as the transaction number, the device further comprising means for:

receiving from the Authorization Server S a transaction identifier $IDTR_N$ that is a function depending in non-invertible manner at least on said transaction number N; and sending to the entity B elements comprising at least said transaction identifier $IDTR_N$.

This third device is thus associated with the implementation of the invention as briefly mentioned above in which the transmission of the transaction identifier $IDTR_N$ from the Authorization Server S to the entity B is relayed via the entity A.

The invention also provides a device combining the means of the last two devices briefly described above; depending on circumstances, such a device may behave either as an originating entity A or as a destination entity B.

The advantages offered by these devices are essentially the same as those offered by the corresponding methods briefly described above.

It should be observed that it is possible to implement the secure communications method of the invention by means of software instructions and/or by means of electronic circuits.

The invention thus also provides a computer program downloadable from a communications network and/or stored on a computer-readable medium and/or executable by a microprocessor. The computer program is remarkable in that it includes instructions for implementing said means comprised in any of the secure communications devices briefly described above.

The advantages offered by the computer program are essentially the same as those offered by said devices.

BRIEF DESCRIPTION OF THE DRAWINGS

Other aspects and advantages of the invention appear on reading the following detailed description of particular embodiments, given as non-limiting examples. The description refers to the accompanying figures, in which.

DETAILED DESCRIPTION

Figure 1:
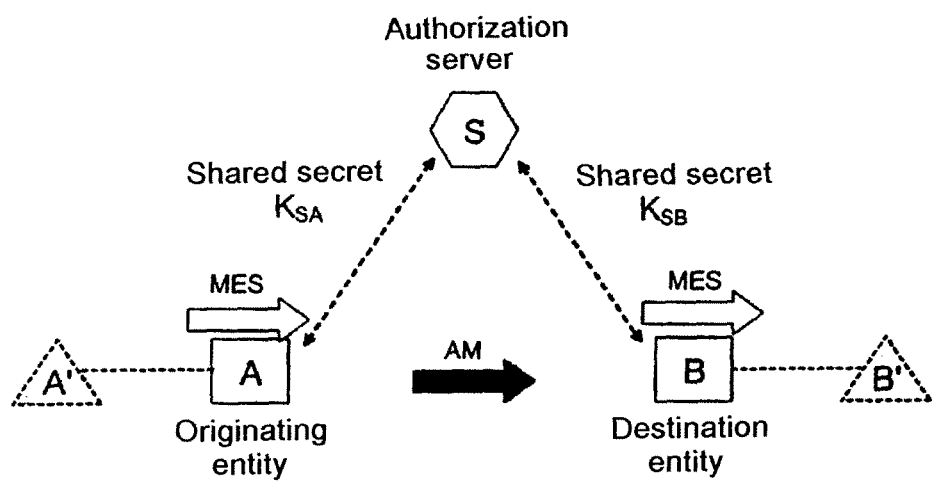
FIG. 1 is a diagrammatic representation of a telecommunications network and of the main entities to which the invention applies.

The system shown in FIG. 1 comprises at least three entities that are interconnected via a communications network, e.g. a network of the Internet type. The method is particularly advantageous for a non-connected transport mode, but it also applies to a connected transport mode.

The entities A and B are subscribers to the same secure communications service. In conventional manner, each of them uses a terminal or a server suitable for sending or receiving messages of any kind such as, for example, emails or telephone calls over channels that are fixed or mobile. In the context of the present invention, and in order to simplify the description, it should be observed that the term "server" is used uniformly to designate any type of computer device, and not only those computer devices that are conventionally known under the name of "servers".

In practice, the entity A may act as a server or a relay for an entity A' connected to the entity A; likewise, the entity B may act as a server or relay for an entity B' connected to the entity B.

The entity S is a "Authorization Server" (which may naturally be made up in practice of a plurality of physical servers). This entity S enables any subscriber entity A to communicate in secure manner with any subscriber entity B; furthermore, it protects the entity B against receiving undesirable messages. Depending on applications and deployment scenarios, the entity S may be independent of the networks or application domains to which the entities A and B belong, or the entity S may form part of the same network or application domain as the entity A and/or the entity B.

Preferably, the Authorization Server S takes account of a sequence of integer values, referred to as "authorization numbers", separately for each entity subscribing to the secure communications service. The authorization number M serves to sequence transactions initiated by a subscriber entity A (or an entity for which the subscriber entity A acts as a server or relay, where applicable). On initialization of the method, the entities S and A agree on an initial authorization number $M_0$ that preferably varies from one entity A to another. Thereafter, on each transaction, the authorization number M is modified by an algorithm that may be public; for example M may be incremented by 1 on each new transaction, however the algorithm may also vary from one entity A to another, in which case it needs to form part of the secrets that are shared between the entities S and A. In any event, the authorization number is never transmitted from one entity to another. By means of these provisions, it is impossible for an attacker to find out the current value of the authorization number of an entity A.

Likewise, the Authorization Server S takes account of a sequence of integer values, known as "transaction numbers", separately for each entity subscribing to the secure communications service. The transaction number N serves to sequence the transactions in which a subscriber entity B participates, but that are initiated by a subscriber entity other than the entity B (or an entity for which the entity B acts as a server or relay, where applicable). On initialization of the method, the entities S and B agree on an initial transaction number $N_0$, which number preferably varies from one entity B to another. Thereafter, on each transaction, the transaction number N is modified using an algorithm that may be public; for example N may be incremented by 1 on each new transaction, however the algorithm may also vary from one entity B to another, in which case it needs to form part of the secrets shared between the entities S and B. In any event, the transaction number is never transmitted from one entity to another. By means of these provisions, it is impossible for an attacker to find out the current value of the transaction number of an entity B.

The transaction having the transaction number N must be authorized by the Authorization Server S following an authorization request sent by the entity A to S. If approved, the Authorization Server S replies to this authorization request by providing the entity A with the information needed to make contact with the entity B.

During each transaction, after identification of the entity A, the Authorization Server S determines a long-term secret key $K_{SA}$ that it shares with the entity A. This long-term secret key $K_{SA}$ enables other secret keys to be derived that are used, when needed, to ensure the integrity or confidentiality of the messages exchanged between A and S.

Likewise, there exists a long-term shared secret $K_{SB}$ that is shared between the entities S and B. This long-term secret key $K_{SB}$ enables other secret keys to be derived that are used, when needed, to ensure the integrity or confidentiality of messages exchanged (directly or indirectly) between S and B.

For each authorization of number M, the entities S and A are preferably capable of acting independently, by using algorithms that may be public, to generate:
- a "request identifier" $IDREQ_M$ that must depend at least on M and that must be generated by means of an algorithm such that even if one or more values of $IDREQ_M$ used in preceding transactions is/are known, it is not possible to deduce therefrom the current value of M, or a value $IDREQ_{M+i}$ (i>0); and
- an "authorization identifier" $IDAUT_M$, that must depend at least on M and that must be generated by means of an algorithm such that even if one or more values of $IDAUT_M$ used in preceding transactions is/are known, it is not possible to deduce therefrom the current value of M, or a value $IDAUT_{M+i}$ (i>0).

Likewise, for any transaction of number N, the entities S and B are capable of acting independently by using algorithms that may be public to generate a "transaction identifier" $IDTR_N$ that must depend at least on N and that must be generated by means of an algorithm such that even if one or more values of $IDTR_N$ used in preceding transactions is/are known, it is not possible to deduce therefrom the current value of N, or a value $IDTR_{N+i}$ (i>0).

In order to achieve greater security, it is possible to make the transaction identifier $IDTR_N$ depend both on the transaction number N and on the secret key $K_{SB}$.

Furthermore, the entities S and B are capable of acting independently, using algorithms that may be public, to generate the (primary) session key $K_{AB,N}$ that is used between the entities A and B for the current transaction and session; this session key must depend at least on N and on $K_{SB}$, and it must be generated by means of an algorithm such that even if the value of $K_{AB,N}$ and the value of N are known, it is not possible to deduce therefrom the value of $K_{SB}$.

In conventional manner, the primary session key (or transaction key) $K_{AB,N}$ enables other secret keys to be derived that are used when needed for ensuring the integrity or confidentiality of messages exchanged between A and B.

Figure 2:
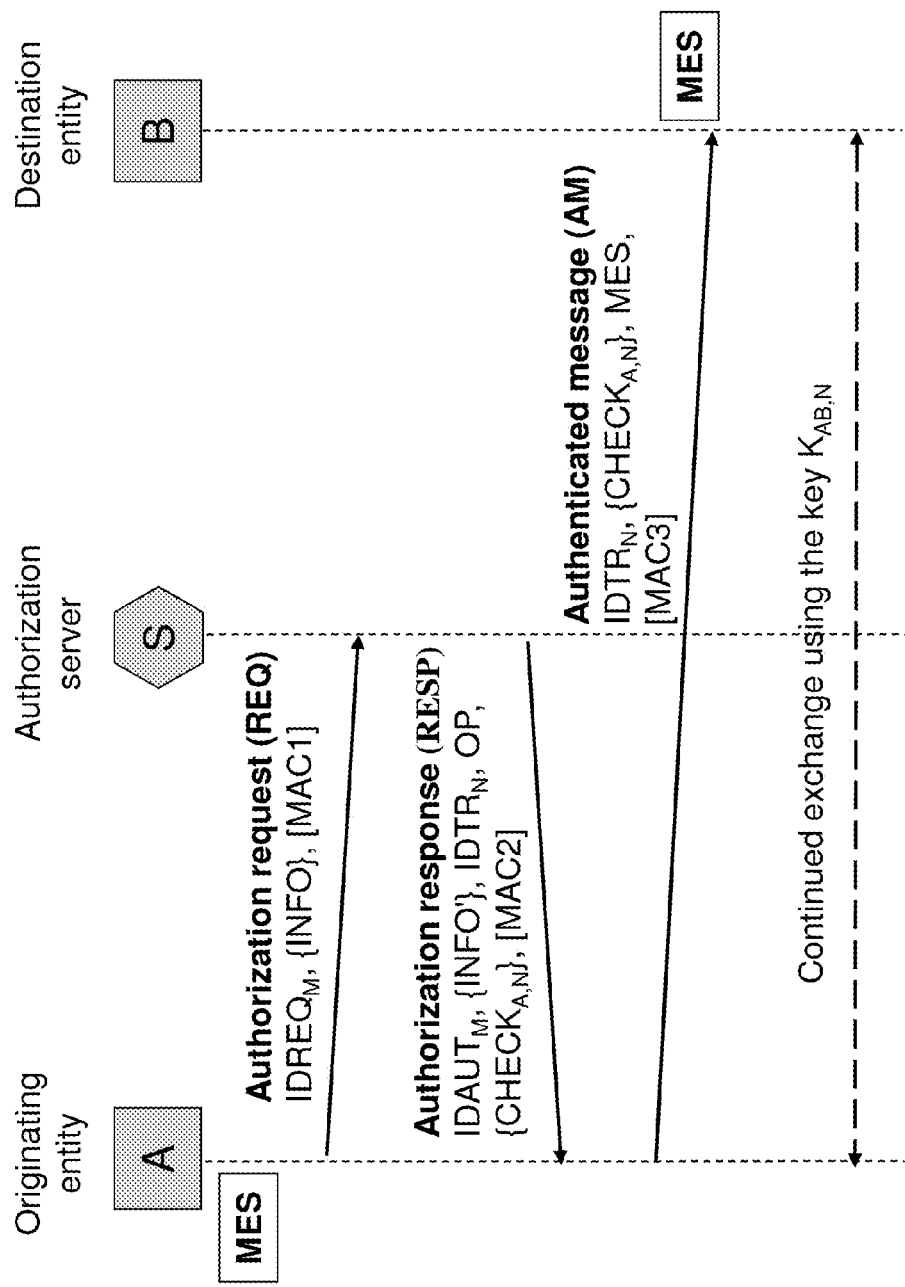
FIG. 2 is a diagram of the steps of a secure communications method in a first implementation of the invention.

FIG. 2 is a diagram of the steps of a first implementation of the method of the invention, in which the transmission of the transaction identifier $IDTR_N$ from the Authorization Server S to the entity B is relayed by the entity A.

The main purpose of the present implementation is to install a session key $K_{AB,N}$ between the entities A and B for the transaction of number N and to do so in a manner that is secure, with the subsequent use made of this session key $K_{AB,N}$ by the entities A and B during the session being of no importance from the point of view of the invention (where such use may for example be the confidential transmission of multimedia streams or electronic payments).

As a concrete example, it is assumed that an "originating client" entity A seeks to send an "original message" MES to one or more "destination client" entity(ies) B. The main steps of this implementation are described below.

During a first step E1, a new transaction is authenticated and authorized by the Authorization Server S.

More precisely, during a substep E1.1, the entity A initiates a transaction by sending an authorization request REQ to the Authorization Server S, with which it shares a secret key $K_{SA}$. This authorization request REQ contains at least one of the elements INFO that enable the Authorization Server S to authenticate the entity A, these elements comprising at least an identifier $ID_A$ of this entity.

Preferably, the authorization request REQ also contains a request identifier $IDREQ_M$, as described above, and calculated for the current authorization number M (i.e. the first value M such that the entity A has previously sent all the requests of authorization numbers preceding this value of M in a predetermined sequence of authorization numbers).

The authorization request REQ may also contain information characterizing the message MES or enabling the entity B to be identified.

Finally, when the integrity of the exchanges between A and S is not ensured by the underlying transport protocol, the authorization request REQ preferably contains an authentication code MAC1 calculated on all or some of the above-mentioned elements of the request REQ. For this purpose, use is made of a secret key derived from the secret key $K_{SA}$, which key is written $K_{SA,M,MAC1}$ if it depends on M (which is preferable in terms of security) and $K_{SA,MAC1}$ if it does not depend on M (in order to simplify the calculations required by the method).

Concerning the identities of the entities A and B, it should also be observed that:
- under certain circumstances, the entity A does not know the full identity of the destination client of its original message MES; this identity is then determined by the Authorization Server S;
- under certain circumstances, for reasons of anonymity, it is possible that the identifier $ID_A$ of the entity A is not revealed to the entity B, or that the entity A asks the Authorization Server S to introduce the entity A to the entity B under a "derived identifier" $ID'_A$; and
- where appropriate, and depending on the architecture under consideration, the identities of A or B may be replaced or associated with the identities of A' or B' (cf. the above description of FIG. 1).

During a substep E1.2, on receiving the authorization request REQ, the Authorization Server S decides as a function of the information contained in the request whether or not to authorize the transaction.

In particular, if the authorization request REQ includes a request identifier IDREQ$_M$, the Authorization Server S compares its value with the request identifier that it calculates or has precalculated for the value(s) of the authorization number M that, in the sequence agreed with the entity A, is to follow the authorization numbers that have previously been used. When the underlying transport protocol is non-connected, it is prudent to make provision for a certain predetermined window for such values of M, since it can happen that the authorization requests REQ are not received by the Authorization Server S in the order in which they were sent by the entity A; this operation identifies the value of the authorization number M associated with the present authorization request REQ.

If the received authorization request REQ is associated with an authentication code MAC1, the Authorization Server S then verifies the integrity of the elements concerned of the authorization request REQ.

Where necessary, the Authorization Server S determines the identity of the destination client(s) B (or B'). Finally, and optionally, the Authorization Server S verifies any black or white lists of the entity B relating to the entity A, e.g. to cover the situation in which the entity B has declared that it refuses all transactions with the entity A in particular.

If the transaction is authorized, the Authorization Server S then acts during a step E2 to send an authorization response RESP to the entity A, which response contains at least the session key $K_{AB,N}$.

When the confidentiality of exchanges between the Authorization Server S and the entity A is not ensured by the underlying transport protocol, the Authorization Server S sends the session key $K_{AB,N}$ in a confidential form written OP to the entity A.

In order to do this, one solution consists merely in encrypting the session key $K_{AB,N}$ using an algorithm that makes use of said secret key $K_{SA}$ or of a key derived from said secret key $K_{SA}$. The session key $K_{AB,N}$ may then be calculated by the entity A from this encrypted form by means of a decryption algorithm that uses the secret key $K_{SA}$ or said key derived from the secret key $K_{SA}$. Nevertheless, such a solution is quite greedy in terms of calculation.

In a variant it is therefore preferable to use a solution that consists in reversibly masking the session key $K_{AB,N}$ by means of a key $K_{SA,M}$ of a value that is a one-way function of the secret key $K_{SA}$ and of the authorization number M: in other words, in this second variant, OP is a public value corresponding to one or more operations that, when applied to said key $K_{SA,M}$, enable the session key $K_{AB,N}$ to be obtained. For example, provision may be made for the key $K_{SA,M}$ to have the same number of bits as $K_{AB,N}$ and for the masked value OP to be calculated merely by using the formula:

$$OP = K_{SA,M} \text{ XOR } K_{AB,N}$$

where the symbol "XOR" designates bit-wise addition (also know as the "exclusive OR" operation). In this example, $K_{AB,N}$ may be recovered from $K_{SA,M}$ and from OP merely by using the formula:

$$K_{AB,N} = K_{SA,M} \text{ XOR OP}$$

From a security point of view, an attacker "listening in" to the exchange between the Authorization Server S and the entity A will know the value OP, but such an attacker cannot deduce $K_{AB,N}$ therefrom since the attacker does not know $K_{SA,M}$ (where discovering $K_{SA,M}$ by an exhaustive search is of complexity of the same order as discovering $K_{AB,N}$).

This second variant also has the advantage that the Authorization Server S and the entity A can precalculate the key $K_{SA,M}$ for any value of the authorization number M, independently of the transaction number N; thereafter, the Authorization Server S can easily calculate the value OP and the entity A can easily deduce the session key $K_{AB,N}$ from the value OP. This precalculation of the key $K_{SA,M}$ may be performed in parallel with other operations, whereas in the first variant, encrypting and decrypting the key $K_{AB,N}$ need to be performed jointly with sending and receiving the authorization response RESP.

Furthermore, concerning the above-described transaction identifier IDTR$_N$, the Authorization Server S also acts, in this first implementation, to transmit this transaction identifier IDTR$_N$ to the entity A, which takes charge of relaying it to the entity B during a substep E3.2 that is described below.

It should be observed that it is optionally possible to transmit the transaction identifier IDTR$_N$ in the clear. Nevertheless, when the confidentiality of exchanges between the Authorization Server S and the entity A is not ensured by the underlying transport protocol, if an attacker were to be able to read its value, then the attacker could act very quickly to send one or more invalid messages to the entity B, thus enabling the messages to be received by the entity B before it receives the legitimate message sent by the entity A. The entity B would detect such an attack but only after performing additional verifications (see below), since the value of the transaction identifier IDTR$_N$ would appear to be correct. The entity B will thus be exposed to a risk of attack by flooding. Thus, in the circumstances under consideration, the Authorization Server S sends the transaction identifier IDTR$_N$ to the entity A preferably after encrypting it or masking it by means of the secret key $K_{SA}$ or a secret key derived from this secret key $K_{SA}$, in a manner analogous to the above two variants relating to protecting the session key $K_{AB,N}$.

If the authorization request REQ includes a request identifier IDREQ$_M$, then the authorization response RESP also contains an above-described authorization identifier IDAUT$_M$ calculated using the same value for the authorization number M.

The authorization responses RESP may also contain:
for verification purposes: a subset INFO' of the information INFO contained in the authorization request REQ; and
check data CHECK$_{A,N}$ that is deduced by using a cryptographic function that depends on a secret key $K_{SB,N}$ derived from said secret key $K_{SB}$ and from the transaction number N, and applying the function to a set of elements drawn from the authorization request REQ, preferably together with a random number that is generated simultaneously during each transaction by the Authorization Server S and the entity B (which random number prevents a malicious entity A from discovering the secret key $K_{SB,N}$ by inverting the data CHECK$_{A,N}$).

As mentioned above, it is possible to envisage applications of the invention in which the entity A is authorized to remain anonymous for the entity B; under such circumstances (and possibly in other circumstances as well), said elements that are drawn from the authorization request REQ and that are encrypted to provide the data CHECK$_{A,N}$ do not contain any identifier of the entity A, nor do they contain said derived identifier ID'$_A$ of the entity A.

Finally, when the integrity of exchanges between A and S is not ensured by the underlying transport protocol, the authorization response RESP preferably contains an authentication code MAC2 calculated on all or some of the above-mentioned elements of the response RESP. To do this, use is made of a secret key derived from the secret key $K_{SA}$, which key is written $K_{SA,M,MAC2}$ if it depends on M (which is preferable in terms of security) or $K_{SA,MAC2}$ if it does not depend on M (in order to simplify the calculations required by the method).

In a step E3, the entity A receives the authorization response RESP from the Authorization Server S, and sends an "authenticated message" AM to the entity B.

More precisely, during a substep E3.1, and after receiving the authorization response RESP, the entity A preferably performs the following verifications:

if the received authorization response RESP contains an authorization identifier $IDAUT_M$, the entity A compares its value with the authorization identifiers that it calculates or has calculated beforehand for the values of M associated with earlier authorization requests sent by the entity to the Authorization Server S and for which the entity A has not yet received an authorization response; this operation identifies the value of the authorization number M associated with the present authorization response RESP;

if the received authorization response RESP contains data that is supposed to belong to a subset of the information contained in the authorization request REQ, the entity A verifies that this information does indeed correspond to an authorization request REQ that it has previously sent; and if the received authorization response RESP is associated with an authentication code MAC2, the entity A verifies all of the elements concerned of the authorization response RESP.

If these verifications are positive, then during a substep E3.2, the entity A extracts from the authorization response RESP: the session key $K_{AB,N}$ (where appropriate passing via the confidential value OP as described above); the transaction identifier $IDTR_N$; and, where appropriate, the data $CHECK_{A,N}$. The entity A then sends an "authenticated message" AM to the entity B, which message AM comprises the original message MES, the transaction identifier $IDTR_N$, and, where appropriate, the data $CHECK_{A,N}$.

When the integrity of exchanges between A and B is not ensured by the underlying transport protocol, the authenticated message AM preferably contains an authentication code MAC3 calculated on all or some of the above-mentioned elements of this message AM; to do this, use is advantageously made of the session key $K_{AB,N}$ or of a secret key $K_{AB,N,MAC}$ derived from the session key $K_{AB,N}$.

Except when complete anonymity is required, the authenticated message AM includes the identifier $ID_A$ or the derived identifier $ID'_A$ of the entity A. This identifier may naturally itself form part of said elements that are used as a basis for calculating the authentication code MAC3.

In a variant (cf. in particular the architecture examples described below), it should be observed that the authenticated message AM may be sent by an authorized entity other than the entity A itself, e.g. another network server. The situation in which the authenticated message AM is sent "directly" by the Authorization Server S is described below with reference to FIG. 3.

In a step E4, the entity B receives the authenticated message AM and determines the session key.

More precisely, during a substep E4.1, after receiving an authenticated message AM, the entity B verifies that the received element $IDTR_N$ does indeed correspond to an expected transaction identifier. Preferably, the entity B pre-calculates values $IDTR_N$ for a predetermined sequence of values N.

If the received value $IDTR_N$ is valid, the entity B deduces therefrom the current value N of the transaction number and recovers or calculates the session key $K_{AB,N}$, optionally together with said secret key $K_{SB,N}$ and/or said secret key $K_{AB,N,MAC}$ that are associated with this transaction.

Optionally, the entity B then verifies that:

the information that the entity B has received is consistent with the authentication code MAC3 (if present) and with the session key $K_{AB,N}$ or the secret key $K_{AB,N,MAC}$; and/or the information that the entity B has received is consistent with the data $CHECK_{A,N}$ (if present) and with the secret key $K_{SB,N}$.

In particular, where appropriate, the entity B uses said secret key $K_{SB,N}$ to verify consistency between firstly the data $CHECK_{A,N}$ and secondly said elements including the identifier $ID_A$ or the derived identifier $ID'_A$ as received from the entity A.

Finally, if these verifications are positive, during a substep E4.2, the entity B extracts the original message MES from the authenticated message AM, and, where appropriate, transmits this original message MES to a destination client B'.

Figure 3:
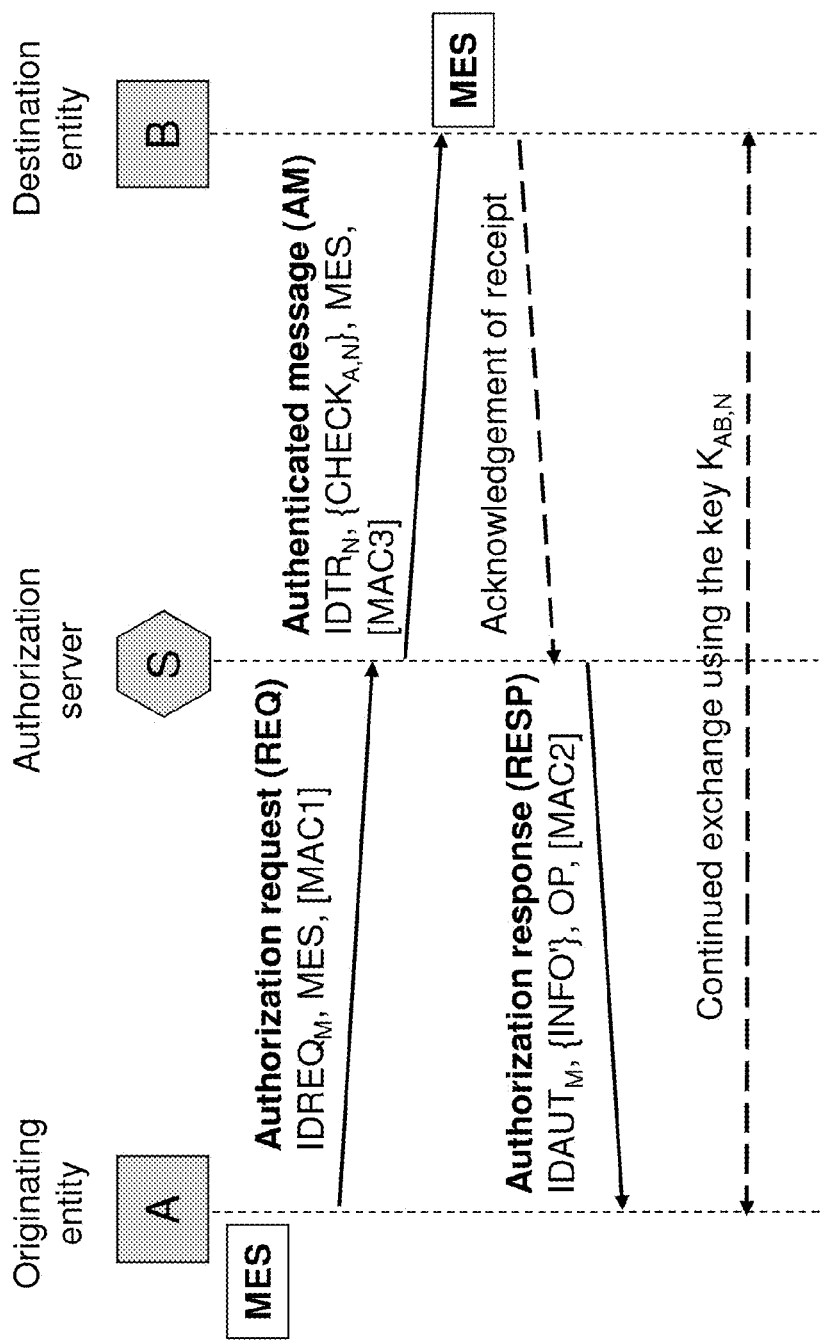
FIG. 3 is a diagram of the steps of a secure communications method in a second implementation of the invention.

FIG. 3 is a diagram of the steps in a second implementation of a method of the invention.

In this implementation, an "originating client" entity A desires to send a genuine original message MES to one or more "destination client" entity(ies) B. Furthermore, the original message MES may in certain applications (e.g. if the message MES is a request to initiate a voice call) act simultaneously as an authorization request REQ.

The present implementation differs essentially from the first implementation as described above with reference to FIG. 2 in that the Authorization Server S transmits the authenticated message AM to the entity B "directly", i.e. without using the entity A as a relay. This implementation thus presents the drawback of additional processing for the Authorization Server S, but it may nevertheless be found to be practical with certain architectures (see the examples below).

There follows a description of the main steps of this implementation.

The first step E'1 is analogous to the step E1 of the first implementation. Nevertheless, it should be observed in this second implementation that the authorization request REQ sent by the entity A to the Authorization Server S always contains the original message MES in full.

The second step E'2 is analogous to the step E2 of the first implementation, except in that the authorization response RESP contains neither the transaction identifier $IDTR_N$ nor the data $CHECK_{A,N}$.

During a step E'3, the Authorization Server S transmits the authenticated message AM "directly" to the entity B, this message comprising the original message MES, the transaction identifier $IDTR_N$, and, where appropriate, the data $CHECK_{A,N}$. When the integrity of exchanges between S and B is not ensured by the underlying transport protocol, the authenticated message AM preferably contains an authentication code MAC3 calculated on all or some of the above-mentioned elements of the message AM; to do this, as in the first implementation, use may be made of the session key $K_{AB,N}$, or of a secret key $K_{AB,N,MAC}$ derived from the session key $K_{AB,N}$; in a variant, it is possible in this example to use the secret key $K_{SB}$ or a secret key derived from the secret key $K_{SB}$.

As shown in FIG. 3, it should be observed that the step E'3 may precede the step E'2. Working in this order makes it possible advantageously to interrupt the transaction before the Authorization Server S sends the authorization response RESP to the entity A, in the event that the entity B does not send an acknowledgment of receipt to S for the authenticated message AM, assuming that such a receipt is expected, or in the event that the entity B sends S an acknowledgment of receipt in which said entity B declares that it refuses this transaction with the entity A.

Finally, the step E'4 is analogous to the step E4 of the first implementation. In particular, if the authenticated message AM has been integrity protected by means of an authentication code MAC3, the entity B verifies compatibility between said code and the other received information by using the appropriate secret key.

It should be observed that this step E'4 must naturally take place after the step E'3, but that it may precede the step E'2.

Various possible architectures for implementing the invention are examined below as examples.

The first three examples relate to VoIP. VoIP services and networks constitute an application context that is of particular interest since, in addition to high levels of security constraints, they are also the subject of constraints relating to use in real time, to the number of entities that have been deployed (presently several million in some networks), to the power of terminals, and also to legal constraints that require the ability to intercept sensitive calls. This need for legal interception naturally encourages session key control to be performed by a trusted entity (here the Authorization Server S), which entity may then be a proxy of a network operator.

a) Intra-Domain VoIP Calls

The client entities A and B and the Authorization Server S all form part of a network belonging to a single operator. The Authorization Server S is a VoIP proxy of that network and conventionally it has a secret that it shares with each of the client terminals, which secret was set up during a stage of subscribing to the service, and has subsequently been verified during a stage of registering the client terminal with the network.

The authorization request REQ sent by the entity A enables the Authorization Server S to authenticate the entity A and to determine the routing for reaching the entity B.

The call may then be set up directly between the entities A and B without it being necessary to set up a TLS connection between A and B in order to ensure integrity and confidentiality of signaling. The message MES corresponds to the "INVITE" request.

b) Mode 1 VoIP Interconnections

In this implementation, the originating and destination entities are located in two distinct networks, belonging to different operators; the originating domain is written D-ORIG and the destination domain D-DEST.

The entity A is one of the outgoing proxies from the originating domain D-ORIG. The entity A serves a plurality of client terminals A' of the domain D-ORIG or sending servers A' in the same domain, or in a third-party domain when the client terminal is mobile and on the move.

The Authorization Server S is one of the incoming proxies of the destination domain D-DEST. The Authorization Server S protects and serves one or more entities B that may belong to the destination domain D-DEST or to third-party domains.

The entity B may correspond directly with the destination client terminal. In a variant, the entity B may correspond with a receiving server that forms part of the destination domain D-DEST or of a third-party domain, in which case the genuine destination client terminal corresponds to the entity B'.

In the authorization request REQ, the entity A references the destination entity B via one or more identifiers at networks, transport, or application level, such as the network address of the entity B, the domain name to which the entity B belongs, and session initiation protocol universal resource identifier (SIP_URI) or a Tel_URI designating the destination client entity. Likewise, the entity A identifies itself using one or more identifiers at network, transport, or application level, such as its network address, or the name of the domain in which it belongs, or an SIP_URI or a Tel_URI designating the originating client entity.

Achieving a transaction of number N enables A and B to share the primary session key $K_{AB,N}$. This session key enables the call setup message "INVITE" to be authenticated. In addition, it may also serve to authenticate the other stages of the call ("CANCEL", "ACK", "BYE" requests or associated responses). It may also make it possible to derive secondary keys for media stream encryption.

The authorization request REQ and the authorization response RESP are exchanged between an originating server and a destination server, where the message AM is sent by an originating server or a sending server to a receiving server.

c) Mode 2 VoIP Interconnections

As above, the originating and destination entities are located in two distinct networks referenced D-ORIG and D-DEST.

The entity A is a client terminal of the domain D-ORIG or else a sending server of the originating domain or of a third-party domain. If the entity A is a sending server, then the real originating client corresponds to an entity A'.

The Authorization Server S is one of the outgoing proxies from the originating domain D-ORIG, i.e. an originating server. The Authorization Server S serves the entities A of the originating domain or of third-party domains, and it authorizes calls with the destination domain.

The entity B is one of the incoming proxies of the destination domain D-DEST. This entity serves and protects entities B' that are either direct client terminals or else receiving servers belonging to the destination domain or to third-party domains.

The authorization request REQ and the authorization response RESP are exchanged in the originating domain or between the sending domain and the originating domain, whereas the message AM is sent by a client entity or a sender server to the destination server.

d) Sending an Email or Instant Message (IM)

The architecture is similar to that for VoIP interconnections (mode 1 or mode 2) so far as the entities A, A', S, B, and B' are concerned.

The identifiers used in the transaction request for designating the entities A or A' (or respectively B or B') are email addresses, IM addresses, or domain names.

Implementing the transaction number N enables A and B to share the primary session key $K_{AB,N}$. This session key is used to authenticate and ensure the integrity of the email message or the IM sent from A to B.

e) Setting Up a Secure Connection

The entity A sends an authorization request to the Authorization Server S which protects accesses to the entity B with which the entity A seeks to communicate.

The authorization request includes the identifiers of the entities A and B in the form of network or transport addresses or application addresses relating to the service in question.

Implementing the transaction number N enables A and B to share the primary session key $K_{AB,N}$. This session key is then used to set up a secure connection (IPSec, TLS, DTLS, etc.) between the entities A and B.

f) Application to a Service of the DNS/ENUM Type

This application of the method of the invention relates to a mapping service where the Authorization Server S is a server of the domain name server (DNS) type or of the E.164 telephone number mapping (ENUM) type for VoIP applications. This makes it possible to avoid attacks in which a calling VoIP entity claims a telephone number that is not allocated to its network or to its application domain.

In this application, the entity A is one of the outgoing proxies from the domain "domain1" and it has a secret that it shares with the Authorization Server S. Before sending a call to the entity B, the entity A sends an authorization request to the Authorization Server S to authenticate the caller and to obtain a secret key for a call to B.

The Authorization Server S is a server of the DNS/ENUM type that has secrets $K_{SA}$, $K_{SB}$ that are shared with a certain number of domains as a result of a prior mapping stage. The Authorization Server S acts as a trusted third party.

The entity B is one of the outgoing proxies of the domain "domain2" and it has a secret that it shares with the Authorization Server S.

Implementing a transaction enables the entity B to verify that the calling identifier presented by the entity A in the "INVITE" request has indeed been authenticated by the Authorization Server S. It also enables the entities A and B to have a shared secret $K_{AB,N}$ that may be used for protecting the remainder of their exchange or for protecting media streams.

The method of the invention may be implemented within telecommunications network nodes (in particular the terminals or servers of entities such as A or B subscribing to the secure communications service of the invention, or the Authorization Server S) by means of software and/or hardware components.

The software components may be incorporated in a conventional computer program for managing a network node. That is why, as mentioned above, the present invention also relates to a computer system. The computer system comprises, in conventional manner: a central processor unit using signals to control to memory, and also an input unit and an output unit. The computer system may also be used for executing a computer program including instructions for implementing the secure communications method of the invention.

The invention also provides a computer program downloadable from a communications network, the program including instructions for executing at least some of the steps of a secure communications method of the invention when it is executed on a computer. The computer program may be stored on a computer readable medium and it may be suitable for being executed by a microprocessor.

The program may be in any programming language, and it may be in the form of source code, object code, or code intermediate between source code and object code, such as in a partially compiled form, or in any other desirable form.

The invention also provides a computer-readable data medium that includes instructions of a computer program as mentioned above.

The data medium may be any entity or device capable of storing the program. For example, the medium may comprise storage means such as a read-only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electric or optical cable, by radio, or by other means. The computer program of the invention may in particular be downloaded from an Internet type network.

In a variant, the data medium may be an integrated circuit in which the program is incorporated, the circuit being adapted to be used in a secure communications device of the invention.

The invention claimed is:

1. A secure communications method for use in a telecommunications network, wherein a transaction between an entity A and an entity B of said network comprises the following steps:
   a) the entity A sends an authorization request to an Authorization Server S, in which request the entity A identifies itself and authenticates itself as the holder of an identifier $ID_A$;
   b) the entity A declares to the Authorization Server S its intention to communicate with a certain entity B; the Authorization Server S determines a secret key $K_{SB}$ that it shares with the entity B; and
   c) the Authorization Server S generates a session key $K_{AB,N}$ and sends it to the entity A;
   wherein said session key $K_{AB,N}$ is a one-way function of said secret key $K_{SB}$ and is also a function of an integer N allocated to said transaction, which integer is referred to as the transaction number, and further comprising the following steps:
   d) the Authorization Server S also generates a transaction identifier $IDTR_N$ that is a function depending at least on said transaction number N in non-invertible manner;
   e) the Authorization Server S causes elements to reach the entity B, which elements comprise at least said transaction identifier $IDTR_N$; and
   f) the entity B verifies at least that the value of the transaction identifier $IDTR_N$ received during said step e) appears within a set of values precalculated by the entity B and corresponding to at least one predicted value for a transaction number; if so, the entity B deduces therefrom firstly the current value of the transaction number N and subsequently the value of the session key $K_{AB,N}$.

2. The secure communications method according to claim 1, wherein said authorization request comprises a request identifier $IDREQ_M$ that is a function depending in non-invertible manner at least on an integer M allocated to said authorization request, and referred to as the authorization number.

3. The secure communications method according to claim 2, wherein, during said step c), the Authorization Server S also sends to the entity A an authorization identifier $IDAUT_M$ that is a function that depends in non-invertible manner at least on said authorization number M.

4. The secure communications method according to claim 1, wherein all or some of said elements sent to the entity B during said step e) are integrity protected.

5. The secure communications method according to claim 4, wherein said integrity protection is performed by means of said session key $K_{AB,N}$ or a key derived from said session key $K_{AB,N}$.

6. The secure communications method according to claim 1, wherein said elements that the Authorization Server S causes to reach the entity B during said step e) also comprise check data $CHECK_{A,N}$ depending on the transaction number N and deduced by means of a cryptographic function depending on a secret key $K_{SB,check}$ derived from said secret key $K_{SB}$, from a set of elements taken from said authorization request, and optionally from the transaction number N.

7. The secure communications method according to claim 1, wherein the entity A causes the entity B to receive said identifier $ID_A$ of the entity A or else an identifier $ID'_A$ derived therefrom.

8. The secure communications method according to claim 6, wherein:
   said set of elements from which said data $CHECK_{A,N}$ is deduced comprise the identifier $ID_A$ of the entity A or a derived identifier $ID'_A$, which entity A causes entity B to receive; and
   during said step f), the entity B uses said secret key $K_{SB,check}$ to verify consistency between firstly the data $CHECK_{A,N}$ received in accordance with claim 6 and secondly said set of elements comprising an identifier $ID_A$ or a derived identifier $ID'_A$.

9. A device referred to as an Authorization Server for securing communications in a telecommunications network during a transaction between an entity A and an entity B, the device comprising a processor for executing a computer program including instructions for:
   identifying and authenticating an entity A holding an identifier $ID_A$;
   determining a secret key $K_{SB}$ that said Authorization Server S shares with an entity B with which the entity A declares its intention to communicate; and
   generating a session key $K_{AB,N}$ and sending it to the entity A;
   wherein said session key $K_{AB,N}$ is a one-way function of said secret key $K_{SB}$ and is also a function of an integer N allocated to said transaction and referred to as the transaction number, and the device also comprises means for:
   generating a transaction identifier $IDTR_N$ that is a function depending in non-invertible manner at least on said transaction number N so that values of $IDTR_N$ corresponding to predictable values for the transaction number N can be calculated and firstly the current value of the transaction number N and subsequently the value of the session key $K_{AB,N}$ can be deduced therefrom by the entity B; and
   causing said transaction identifier $IDTR_N$ to reach said entity B.

10. A device referred to as an entity B for secure communications in a telecommunications network, the device comprising a processor for executing a computer program including instructions for use during a transaction involving said entity B and an entity A, to:
    receive elements comprising a transaction identifier $IDTR_N$ generated by an Authorization Server S, said transaction identifier $IDTR_N$ being a function depending in non-invertible manner at least on an integer N allocated to said transaction and referred to as the transaction number;
    verify that the value of the received transaction identifier $IDTR_N$ appears within a set of values precalculated by the entity B and corresponding to at least one predicted value for said transaction number;
    deduce therefrom the current value N of the transaction number; and
    deduce therefrom a session key $K_{AB,N}$ that is firstly a function of the transaction number N and secondly a one-way function of a secret key $K_{SB}$ shared by the entity B and said Authorization Server S.

11. A device, referred to as an entity A, for secure communications in a telecommunications network, the device comprising a processor for executing a computer program including instructions for use during a transaction involving said entity A and an entity B to:
    identify itself and authenticate itself as the holder of an identifier $ID_A$ with an Authorization Server S;
    declare to said Authorization Server S its intention to communicate with a certain entity B; and
    receive from the Authorization Server S a session key $K_{AB,N}$;
    the device being characterized in that said session key $K_{AB,N}$ is a one-way function of a secret key $K_{SB}$ shared by the Authorization Server S and the entity B and is also a function of an integer N allocated to said transaction and referred to as the transaction number, the device further comprising means for:
    receiving from the Authorization Server S a transaction identifier $IDTR_N$ that is a function depending in non-invertible manner at least on said transaction number N so that values of $IDTR_N$ corresponding to predictable values for the transaction number N can be calculated and firstly the current value of the transaction number N and subsequently the value of the session key $K_{AB,N}$ can be deduced therefrom by the entity B; and
    sending to the entity B elements comprising at least said transaction identifier $IDTR_N$.

12. Non-transitory data storage that is non-removable, or partially or completely removable, including computer program code instructions for executing the steps of a secure communications method according to claim 1.

13. A non-transitory computer program product stored on a non-transitory computer-readable medium and executable by a processor, the program comprising instructions for implementing the method according to claim 1.

\* \* \* \* \*